United States Patent [19]
Yoshizaki et al.

[11] Patent Number: 5,870,365
[45] Date of Patent: Feb. 9, 1999

[54] START ID RECORDING SYSTEM FOR USE IN A DIGITAL AUDIO INFORMATION RECORDING APPARATUS

[75] Inventors: Isao Yoshizaki, Katano; Naoto Sawada, Neyagawa, both of Japan

[73] Assignee: Matsushita Electric Industrial Co., Ltd., Osaka, Japan

[21] Appl. No.: 837,464

[22] Filed: Apr. 18, 1997

[30] Foreign Application Priority Data

Apr. 19, 1996 [JP] Japan ................................. 8-098260

[51] Int. Cl.⁶ ........................................................ G11B 7/00
[52] U.S. Cl. ................................ 369/48; 369/50; 369/54
[58] Field of Search ................................. 369/32, 47–48, 369/50, 54, 58, 124; 360/8, 48, 72.1–72.3

[56] References Cited

U.S. PATENT DOCUMENTS

| | | |
|---|---|---|
| 4,796,247 | 1/1989 | Vogelsang . |
| 5,023,730 | 6/1991 | Sakata et al. ............................. 360/48 |
| 5,311,492 | 5/1994 | Tabuchi et al. ........................... 369/47 |

FOREIGN PATENT DOCUMENTS

| | | |
|---|---|---|
| 2-198052 | 8/1990 | Japan . |
| 3-12846 | 1/1991 | Japan . |
| 3-183051 | 8/1991 | Japan . |

Primary Examiner—W. R. Young
Attorney, Agent, or Firm—Wenderoth, Lind & Ponack, L.L.P.

[57] ABSTRACT

In a control unit, when a digital input audio signal level is equal to and beyond the first given level at a first time, a delay counter starts the counting operation, and when the digital audio signal level is equal to and beyond the second given level at a second time, an inherent delay time is obtained by calculating the difference between the first and second times, wherein the time difference is compared to the predetermined delay time of a delay memory unit to obtain a time lapse, so that a start ID is recorded at a third time decided by the time lapse after the second time, and thus the start ID signal is recorded at an appropriate position coincident with the starting head of the digital audio signal, thereby realizing a high speed search thereof without an omission of a head portion of the digital audio signal when the digital audio signal is reproduced.

11 Claims, 6 Drawing Sheets

START ID RECORDING SYSTEM FOR USE IN A DIGITAL AUDIO INFORMATION RECORDING APPARATUS

BACKGROUND OF THE INVENTION

1. Field of the Invention

The present invention relates to a start ID recording system for use in a digital audio information recording apparatus, and in particular to a start ID recording system for recording a start ID signal identifying a starting head of a digital audio signal such as a music signal, wherein the start ID signal is recorded on a recording medium at an appropriate position coincident with the starting head of the digital audio signal for realizing a high speed search thereof without an omission of a head portion of the digital audio signal when the digital audio signal is reproduced.

2. Description of the Prior Art

In recent years, a digital compact disc (DCD), mini disc (MD) and other similar recording mediums, as well as a digital audio tape recorder (DAT), have been introduced and put into practical use in various conventional digital audio recording systems. In such a conventional digital audio recording system, a start ID signal such as a specified code number or a head signal for identifying a starting head of a digital audio signal is recorded at a start head position of the digital audio signal so that a desired audio signal can be quickly searched by identifying the start ID signal in a reproduction operation thereof.

However, it has been difficult to precisely record a start ID signal at a precise start head position of a digital audio signal such as a music signal because of the reasons discussed next.

Namely, in a conventional digital audio recording system where a start ID is automatically recorded by detecting a level of an input digital audio signal, when a level higher than a predetermined threshold level is detected, it is determined that an audio signal such as a music signal is started and then a start ID signal is recorded at this point. However, in this type recording system, the predetermined threshold level should be set up sufficiently higher than an audio signal absent level (referred to as "silent level", hereinafter) in order to avoid inclusion of a noise component in detecting the audio signal level. Moreover, it is essentially required to integrate an input digital audio signal in order to remove a pulse noise component.

In consideration of these matters mentioned above, in order to detect the predetermined threshold level, it is indispensable that an inherent time delay ($t_D$) is caused in a degree of zero point several seconds or more from the actual starting time of the input audio signal to the time of detecting the predetermined threshold level. Therefore, if the music signal is searched and reproduced at the delayed time of detecting the start ID, there has been a problem that a rising head portion of the desired music signal located before detecting the start ID is omitted from reproduction.

In order to eliminate this problem, another conventional digital audio recording system has been disclosed as shown in FIG. 11. In this conventional recording system, an input digital audio signal (As) is delayed by a predetermined delay time $T_D$ by means of a known delay unit to thereby obtain a delayed audio signal (As') after the predetermined delay time $T_D$ from the actual starting time of the input audio signal. The predetermined delay time $T_D$ for audio signal is set up to be equal to or slightly larger than the inherent delay time ($t_D$) for generating a start ID at the time of detecting the predetermined threshold level (Ls).

However, in this conventional system, when the recording system is used in a moving condition, for example, for use as a portable apparatus or in a vehicle, erroneous effects of tracking jumps of a scanning optic and the like are occasionally caused due to shocks or vibrations and also high level noise components are possibly detected beyond a predetermined threshold level (Ls). Then, the noise components are erroneously detected and are confused with a rising portion of an actual audio signal level even though the predetermined threshold detection level (Ls) is set up high as shown in FIG. 12. As the result of this, a starting ID such as a music number is erroneously renewed.

Moreover, in order to avoid an erroneous operation due to high noise components, if the threshold level is set up excessively higher than the silent level ($L_O$), when in a reproduction mode for reproducing, for example, classical music having a long lowest weak level in a beginning portion thereof and having a gradually higher portion thereof in level as shown in FIG. 13, the inherent delay time ($t_D$) for a start ID generation becomes considerably large in length. Therefore, when the predetermined delay time $T_D$ for delaying the audio signal is set up to be suitable for general music such as popular music and the like, the predetermined delay time $T_D$ for audio signal is in some cases smaller in length than the inherent delay time $t_D$ for start ID generation. As a result, when the start ID is recorded after the inherent time delay $t_D$ from the actual starting time of the input audio signal and the delayed audio signal As' is generated after the predetermined time delay $T_D$ (which is smaller than $t_D$) from the actual starting time of the input audio signal, a problem arises in that an omission of a head portion of an input audio signal such as in a classical music signal is undesirably caused in the reproduction operation mode thereof.

SUMMARY OF THE INVENTION

The present invention has been developed with a view towards substantially solving the above described disadvantages. Accordingly, an essential objective of the present invention is therefore to provide a start ID recording system for recording a start ID signal at an appropriate position coincident with a starting head of a digital audio signal, thereby reliably avoiding influence of noise components without an omission of a head portion of an audio signal when in reproduction thereof.

In order to achieve the above objective, according to the first aspect of the present invention, the start ID recording system, for recording a start ID signal on a recording medium in a digital audio information recording and/or reproduction apparatus, comprises:

a level detection unit for checking a level (La) of an input digital audio signal with reference to first and second given levels (L1 and L2) wherein the second given level is higher than the first given level;

a delay unit having a memory for temporarily storing the input digital audio signal and generating a delayed audio signal delayed by a predetermined time ($T_D$); and a control unit which includes first and second counters for calculating a time period ($T_R$) between a first time (t1) and a second time (t2) where at the first time (t1) the level detection unit detects that the digital audio signal level (La) becomes equal to and beyond the first given level (L1) and at the second time (t2) the level detection unit detects that the digital audio signal level (La) becomes equal to and beyond the second given level (L2), whereby the control unit calculates a time difference ($T_N$) between the predetermined delay time ($T_D$)

and the time period ($T_R$) calculated by the first and second counters so that the start ID signal is recorded on the medium at a third time (t4) by calculating the time difference ($TN=T_D-T_R$), wherein the start ID recording time (t4) is decided by the time lapse ($T_N$) from the second time point (t2).

The start ID recording system further comprises a signal processing unit in which the delayed digital audio signal outputted from the delay unit is added with the start ID signal to be recorded on the recording medium.

By this arrangement, when the audio signal level (L$a$) detected by the level detection unit becomes equal to or higher than the first threshold level (L1) at the first time point (t1) from the audio blank condition of a silent mode "0", an audio detection mode "1" is set up at this time point (t1) and the delay time counting performed by the first counter is started at the same time. Then, the mode "2" is set up at the second time (t2) when the audio signal level (L$a$) becomes equal to or higher than the second threshold level (L2), and the audio signal number is renewed by 1 as a start ID and the delay detection flag is set up at this time point (t2). Thus, the third time (t4) for recording the start ID is obtained by calculating the time lapse $T_N=T_D-T_R$ from the second time (t2) at which the audio signal level L$a \geq$L2 is detected.

According to a second aspect of the present invention, the start ID recording system further comprises a start ID detection unit for detecting a previously recorded start ID detection time (t1') of the input audio signal (As), wherein the resultant output thereof is applied to the control unit where the applied time value (t1') is compared to the time value (t1) which is the detection result obtained by the level detection unit at the turning point time (t1) from a silent mode "0" to an inherent audio detection mode "1", and when the difference between the recorded start ID detection time (t1') and the detection result (t1) of the level detection unit is within a given range (X2), the start ID signal is recorded on the medium at a time point after the predetermined delay time ($T_D$) from the recorded start ID detection time (t1').

By this arrangement, it is judged whether or not the start ID signal previously recorded in the original medium is correctly positioned, and when judged correct, then the start ID is recorded at a timing point based on the original recorded start ID. Whereas, when judged incorrect, the start ID is recorded in the manner described in the first aspect of the present invention.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
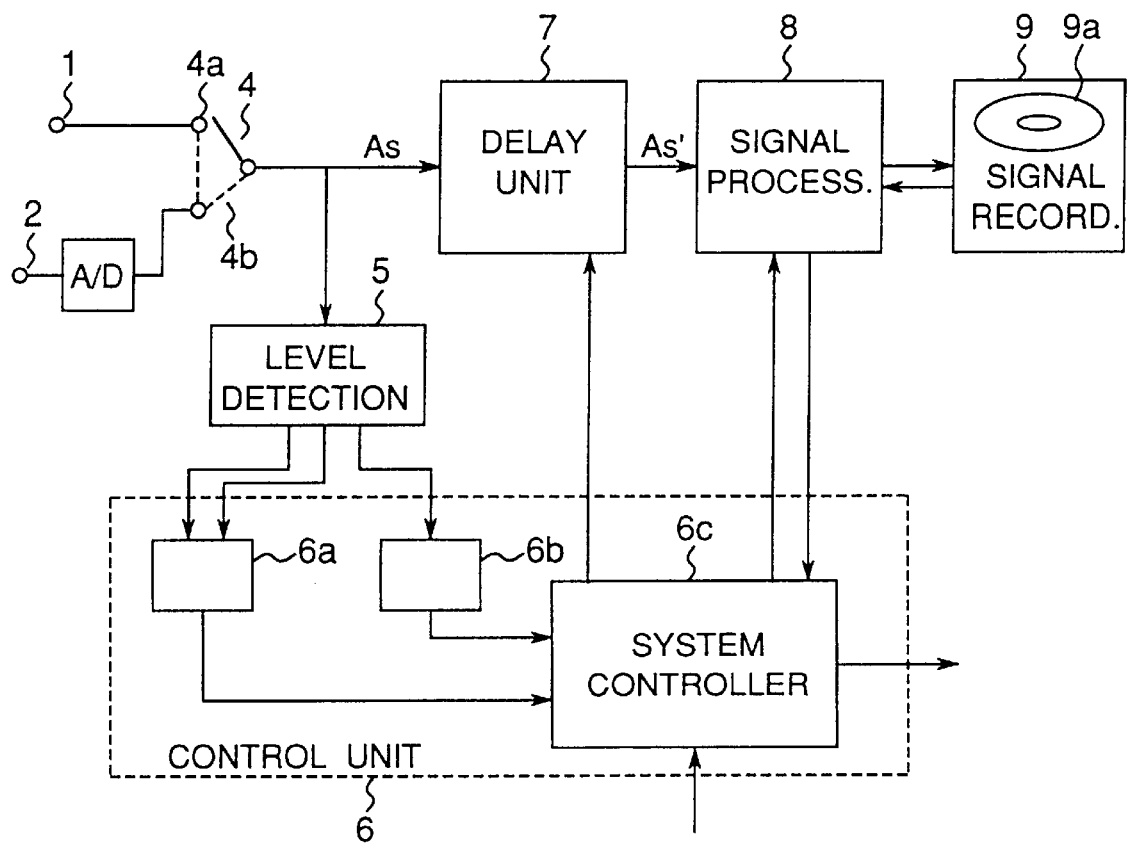
FIG. 1 is a block diagram showing a construction of a start ID recording system according to a first embodiment of the present invention.

Before the description proceeds, it is to be noted that, since the basic structures of the preferred embodiments are common in some respects, like parts are designated by the same reference numerals throughout the accompanying drawings.

FIRST EMBODIMENT

Hereinbelow, a first preferred embodiment of a start ID recording system is described with reference to FIGS. 1 through 8.

In the start ID recording system shown in FIG. 1, when a digital audio signal such as a music signal or the like is applied to a digital input terminal 1, a changeover switch 4 selects a first input terminal 4$a$ to receive the input digital audio signal. Otherwise, when an analog audio signal is applied to an analog input terminal 2, the switch 4 selects a second input terminal 4$b$ to receive the input audio signal to be A/D converted by an A/D converter 3. Then, the digital audio signal (As) fed through the switch 4 is applied in common to both a delay unit 7 and a level detection unit 5.

Figure 2:
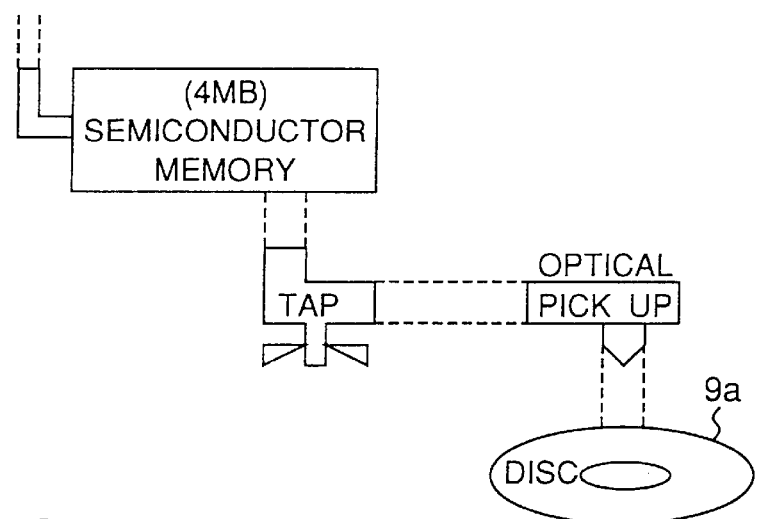
FIG. 2 is a schematic view for explaining a shock-proof memory used as a delay unit.

The delay unit 7 is preferably comprised of a shock-proof memory which is a semiconductor memory having a sufficient memory capacity of, for example, 4 mega-bits to set up a large delay time between the input and output of audio signals thereof in a MD recording and/or reproduction system as shown in FIG. 2. The memory may be a random access memory (RAM), a first-in first-out register (FIFO), or a combination of both these elements. The memory is operated at a constant read-out frequency which is fed by a clock generator (not shown).

By using such a shock-proof memory, when in the recording operation, the input audio signal is temporarily stored in the memory at a rate of, for example, 0.3 megabits/sec continuously and thereafter the output thereof is intermittently read out at a rate of, for example, 1.4 megabits/sec. Thus, a delayed output audio signal can be obtained with a large delay time.

Whereas, in the reproduction operation, the reproduced audio signal is intermittently written in the memory at a rate of 1.4 megabits/sec and then the output signal thereof is continuously read out at a rate of 0.3 megabits/sec. Thus, even when the digital audio signal is reproduced in a moving condition, for example, as a portable apparatus or in a vehicle, by using the shock-proof memory as the delay unit, there can be obtained a remarkable advantage of effectively absorbing erroneous effects of tracking jumps of a scanning optic and the like due to shocks or vibrations caused by the moving condition.

Figure 3:
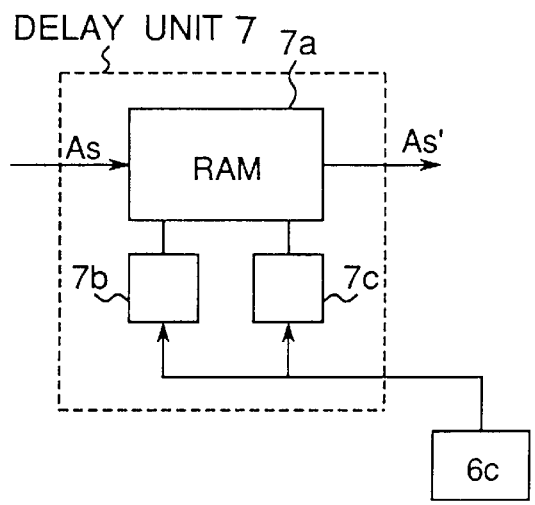
FIG. 3 is a block diagram showing a construction of the delay unit of FIG. 1.

In this arrangement, the delay unit 7 may have a known construction, including a RAM 7$a$, a write-address generator section 7$b$ and a read-address generator section 7$c$ as shown in FIG. 3. Thus, the input digital audio signal (As) is delayed by a predetermined time period $T_D$ to output a delayed audio signal (As'). In a recording operation, the write-address generator 7$b$ sequentially generates write-addresses at a sampling frequency of the input digital audio signal As and writes the input audio signal in the RAM 7$a$ simultaneously.

In the meantime, the read-address generator 7$c$ sequentially generates read-addresses and simultaneously reads out the stored audio signal from the RAM 7a after a predetermined time lapse of $T_D$. By this arrangement, the delay unit 7 outputs the delayed audio signal As' delayed by the predetermined time lapse of $T_D$, which the delayed audio signal As' is applied to a signal processing unit 8.

Referring back to FIG. 1, the level of the input digital audio signal As is checked by the level detection unit 5. The detection results outputted from the level detection unit 5 are applied to first and second counters 6a and 6b provided as timer means in a control unit 6. The control unit 6 controls the signal processing unit 8 based on the detection results so that the start ID signal for renewing the audio signal number such as a music number is recorded on a recording medium 9a in a recording unit 9 in accordance with the outputs of the signal processing unit 8. In the recording operation, sub-code signals such as a start ID, absolute time, program number and the like signals are added to the delayed audio signal As' in the signal processing unit 8, and then the resultant output signal thereof is recorded in the recording unit 9.

Figure 6:
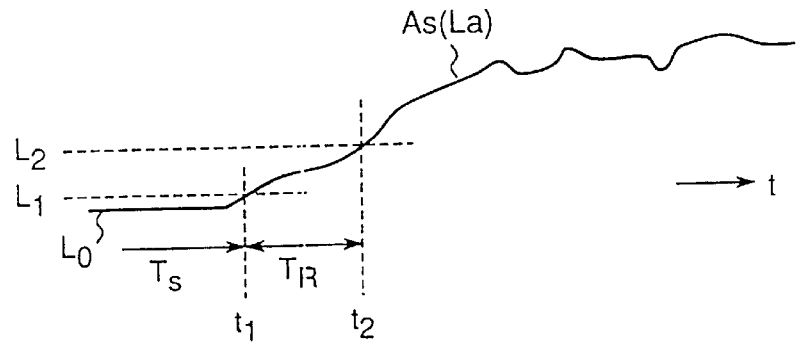
FIGS. 6, 7 and 8 are timing charts for explaining an operation of the first embodiment of the present invention.
Figure 7:
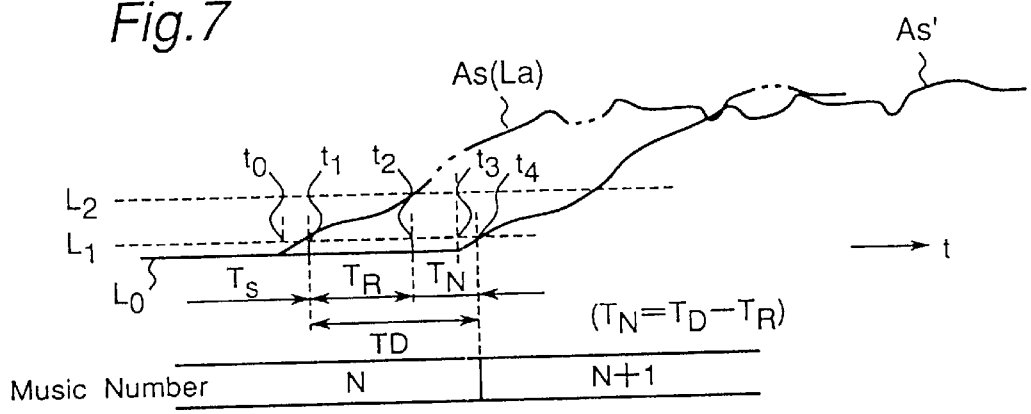
Figure 8:
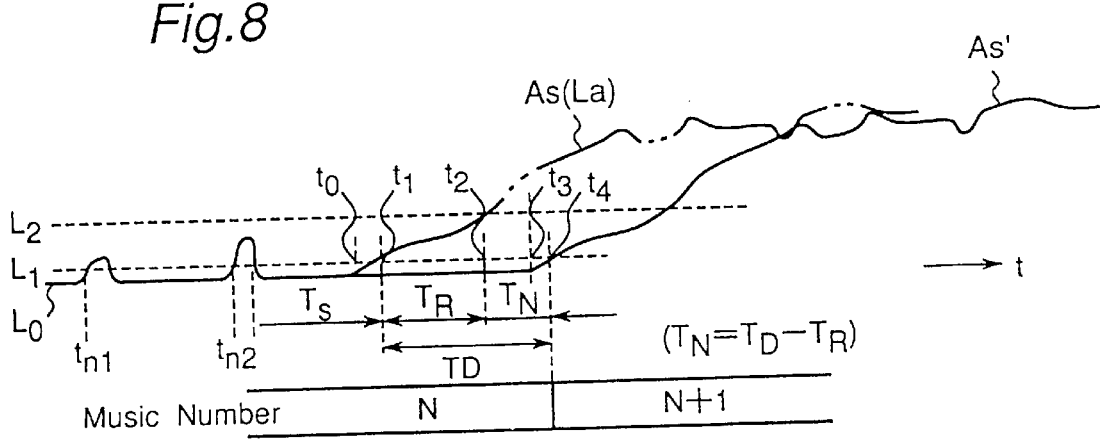

In the control unit 6, the first counter 6a is of a delay counter for counting a delay time $T_R$ between the first detection time t1 of detecting the first threshold level L1 and the second detection time t2 of detecting the second threshold level L2 as shown in FIGS. 6 through 8. The second counter 6b is of a silent duration counter for counting a silent duration time Ts during an audio signal blank period in order to cancel the noise components to thereby only detect the actual starting time of the input audio signal.

Figure 4:
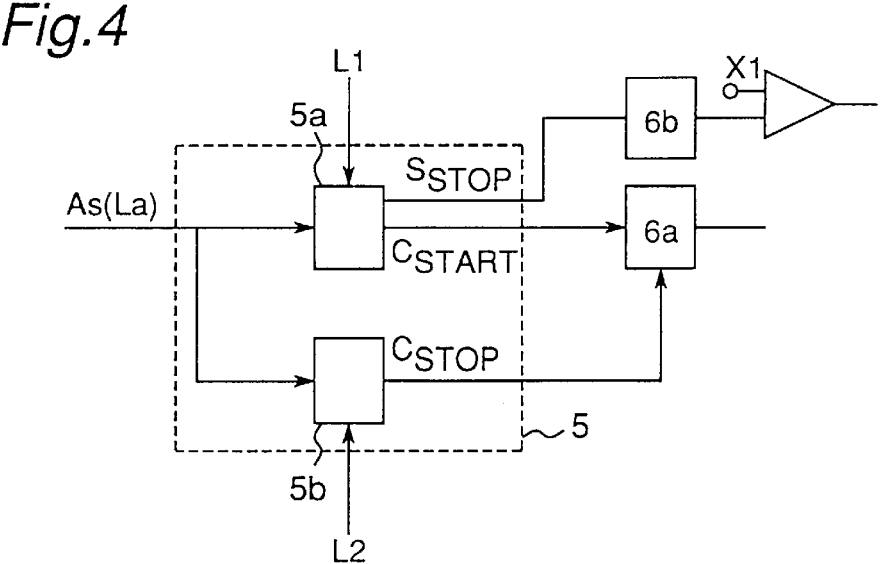
FIG. 4 is a block diagram showing a construction of a level detection unit of FIG. 1.

In more detail, the level detection unit 5 is comprised of first and second level detection sections 5a and 5b as shown in FIG. 4, wherein the first level detection section 5a has the given first threshold level L1 which is set up to be slightly higher than the silent level $L_0$ while the second level detection section 5b has the given second threshold level L2 which is set up to be sufficiently higher than the silent level $L_0$ to reliably detect the digital audio signal level La distinct from the noise components as shown in FIGS. 6 through 8.

In other words, by only setting the first threshold level L1, the rising portion of the actual audio signal is possibly confused with the noise components. Whereas, by further setting the second threshold level L2 in addition to the first threshold level L1, the rising portion of the actual audio signal can be clearly distinguished from the noise components by taking account of the silent duration time as shown in FIG. 8.

Thus, the level La of the input digital audio signal is checked with reference to the first and second threshold levels L1 and L2. In this embodiment, the level detection is effected at a constant time interval of, for example, in a range of 13 ms to 30 ms.

In the level detection unit 5, the digital audio signal As is applied to both the first and second level detection sections 5a and 5b. In the first level detection section 5a, the level La of the audio signal As is checked with reference to the first threshold level L1.

When the level La is lower than the first threshold level L1 (i.e., in the range of $L_0$<La<L1), it is judged that the process of the control unit 6 is in a silent mode (0) and the counting operation effected by the second counter 6b is being performed during the silent mode to thereby count the silent duration time period Ts shown in FIG. 6 or 7. When the audio signal level La becomes equal to the first threshold level L1 at the time t1, it is judged that the silent mode is stopped and a silent stop signal $S_{STOP}$ is transmitted from the first level detection section 5a to the second counter 6b to stop the counting operation thereof. Thus, the silent duration time Ts at this point t1 can be obtained.

When the detection level La is higher than the first threshold level L1 and lower than the second threshold level L2 (i.e., in the range of L1<La<L2), it is judged that the process is to be in an audio detection mode (1) for the inherent delay time $T_R$ and an audio detection signal $C_{START}$ is generated from the first level detection section 5a and is transmitted to the first counter 6a, so that the first counter 6a starts the counting of the inherent delay time $T_R$ in receipt of the audio detection signal $C_{START}$.

However, at this stage, if the audio detection mode "1" is merely set up due to a noise component without an actual rising portion of an audio signal, the audio detection mode "1" can not be maintained for a considerable period and the subsequent detection level La is soon lowered below L1 as denoted by $t_n 1$ and $t_n 2$ in FIG. 8. At this time, the silent mode "0" is restored to remain for a time period longer than a predetermined time period X1, for example, 1 milisecond, and then the silent duration counting of the second counter 6b is again started, while resetting the first counter 6a.

When the detection level La becomes equal to or higher than the second threshold level L2 at the time t2, it is judged that the rising portion of the actual audio signal is detected and at the same time a stop signal $C_{STOP}$ is transmitted from the second level detection section 5b to the delay counter 6a to stop the counting of the delay counter 6a so that a third mode (2) (referred to as "audio delay mode", hereinafter) is set up. Thus, the inherent delay time period $T_R$ at this point t2 can be obtained by calculating t2-t1. Accordingly, by calculating $T_N = T_D - T_R$, the start ID recording time t4 is determined by the time lapse $T_N$ from the time point t2.

In the present embodiment, although the level detection unit, first and second counters, a system controller and the like are individually constructed by way of a circuitry arrangement, it is to be noted here that these components can be realized by way of software of a microcomputer (CPU).

Figure 5:
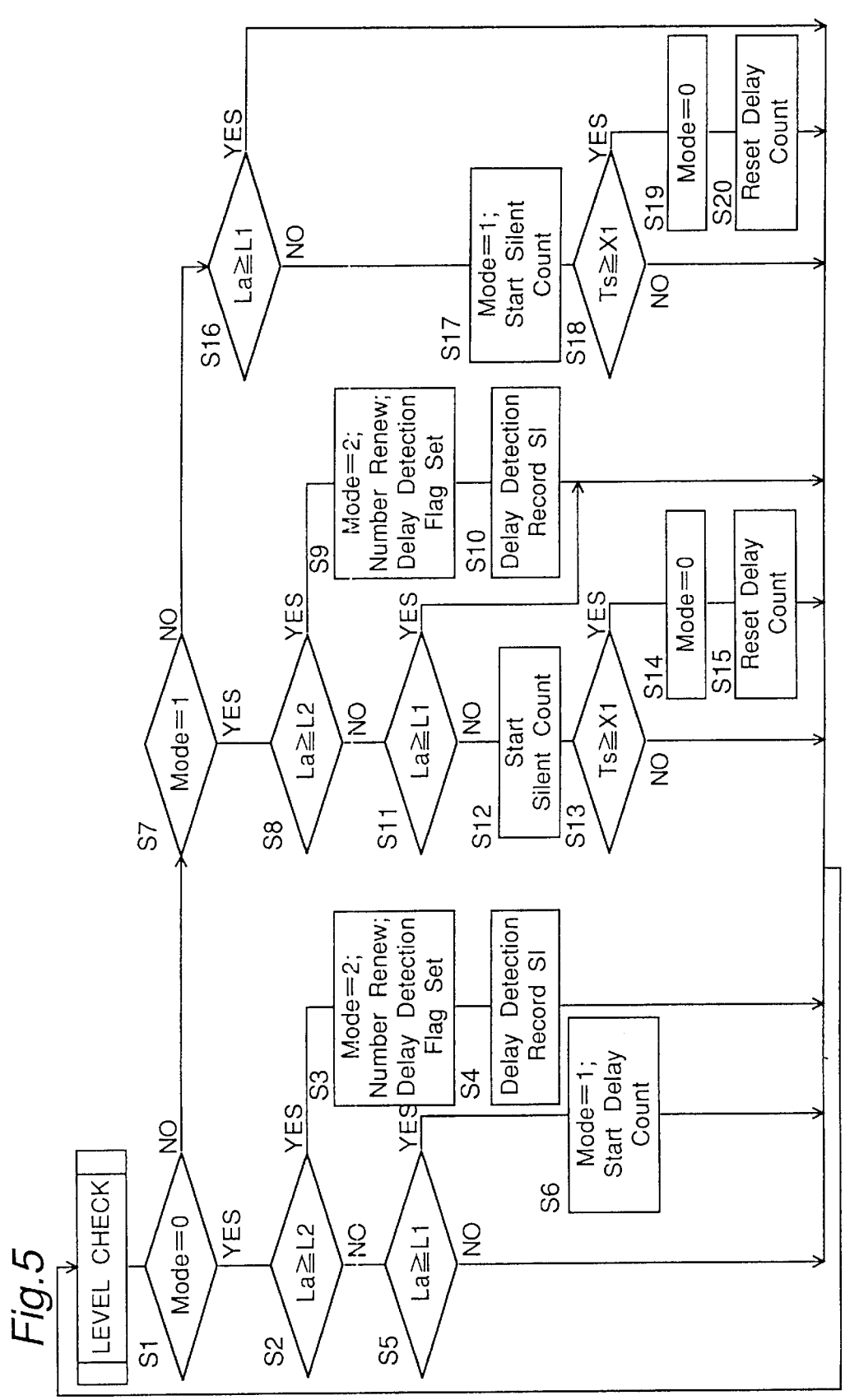
FIG. 5 is a flow chart showing a level detection operation of a level detection unit shown in FIG. 1.

FIG. 5 shows a flow chart explaining a level detection operation of the level detection unit 5 under control of a system controller 6c of the control unit 6.

In step S1, the previous mode of the control unit 6 is judged while the initial mode is set to a silent mode "0". When the previous mode is "0", it is judged in step S2 whether the audio level La is equal to or higher than the second threshold L2. When La≧L2, the mode "2" is set up in step S3 and an audio signal number is renewed (i.e., increased by 1) and a delay detection flag is set up. Subsequently in step S4, the inherent delay time $T_R$ is detected based on the delay detection flag with reference to the count value of the delay counter 6a. Then, the time difference $T_N = T_D - T_R$ is calculated to thereby obtain a time point t4 at which a start ID is to be recorded.

Namely, the controller 6c transmits a start ID write command signal to the signal processing unit 8 so that the start ID is recorded at the time t4. In this step, the start ID recording command may be transmitted at the time t3 slightly before the time t4 taking into consideration the delay for detecting the first threshold level L1.

When La<L2("No" in step S2), it is judged in step S5 whether or not La is equal to or higher than L1. When "Yes" (i. e., La≧L1) in step S5, the audio detection mode "1" is set up in step S6 and the delay time counting operation of the delay counter 6a is started. When La<L1("No" in step S5), it is judged that the process is in the silent mode and the control process is returned to the start step S1.

In the meantime, when it is judged in step S1 that the previous mode of the control unit 6 is not a silent mode "0", the process is advanced to step S7 and it is judged whether or not the previous mode is an audio detection mode "1". When mode=1 ("Yes" in step S7), it is judged in step S8 whether or not La≧L2. When La≧L2 in step S8, the mode "2" is set up in step S9 and the audio signal number is renewed (i.e., increased by 1) as a start ID and a delay detection flag is set up. Subsequently, in step S10, the inherent delay time $T_R$ is detected based on the delay detection flag with reference to the count value of the delay counter 6a. Then the time difference $T_N=T_D-T_R$ is calculated to thereby obtain the time point t4 at which the start ID is to be recorded.

When La<L2 (i.e., "No") in step S8, it is judged in step S11 whether or not La≧L1. When "Yes" (i.e., La≧L1) in step S11, the process is in the audio detection mode similarly as the previous mode and the process of the control unit is returned to the start step S1. When it is judged "NO" in step S11, the silent duration counting of the second counter 6b is started in step S12. If the silent duration counting has been already started, any other process is not effected in addition in this step. Then, it is judged in step S13 whether or not the silent duration time (Ts) is larger than the predetermined value X1 (e.g., 1 milisecond or more). When judged "Yes" in step S13, it is judged in step S14 that the mode is set in the silent mode "0", and then the counting value of the delay counter 6a is reset in step S15. When judged "No" in step S13, it is judged that the process may be in the audio detection mode and the process is returned to the start step S1.

When judged "No" (i.e., Mode=2) in step S7, the process is advanced to step S16 and it is judged whether or not La≧L1, and when "Yes", the process returned to the start step S1. When judged "No" in step S16, Mode "1" is set up in step S17 and the silent duration counting by the second counter 6b is started.

As described above, when the audio signal level La detected by the level detection unit 5 becomes equal to or higher than the first threshold level L1 at the time point t1 from the audio blank condition of the silent mode "0", the audio detection mode "1" is set up at this time point t1 and the delay time counting by the delay counter 6a is started at the same time. Then, the mode "2" is set up at the time t2 when the audio signal level La becomes equal to or higher than the second threshold level L2, and the audio signal number is renewed by 1 as a start ID and the delay detection flag is set up at this time point t2. Assuming that the inherent delay time is $T_R$ and the predetermined delay time of the delay unit 7 is $T_D$, the time t4 for recording the start ID is obtained by calculating the time lapse $T_N=T_D-T_R$ from the time t2 at which the audio signal level La≧L2 is detected.

If a time delay for turning from the silent level $L_0$ (mode 0) to the first threshold level L1 is taken into consideration, transmission of the start ID recording instruction to the signal processing unit 8 may be preferably advanced to the time t3 slightly before the time t4.

When La becomes lower than L2 in the mode "2", the mode "1" is set up in step S17 and the silent duration counting by the second counter 6b is started at the same time. When the silent duration time (Ts) is equal to or more than the predetermined time period X1, for example, 1 (ms) in step S18, the silent mode "0" is set up in step S19, judging that the level La is in the audio blank condition and the count value of the delay counter 6a is reset in step S20, thereby cancelling the effects due to the noise components.

SECOND EMBODIMENT

Figure 9:
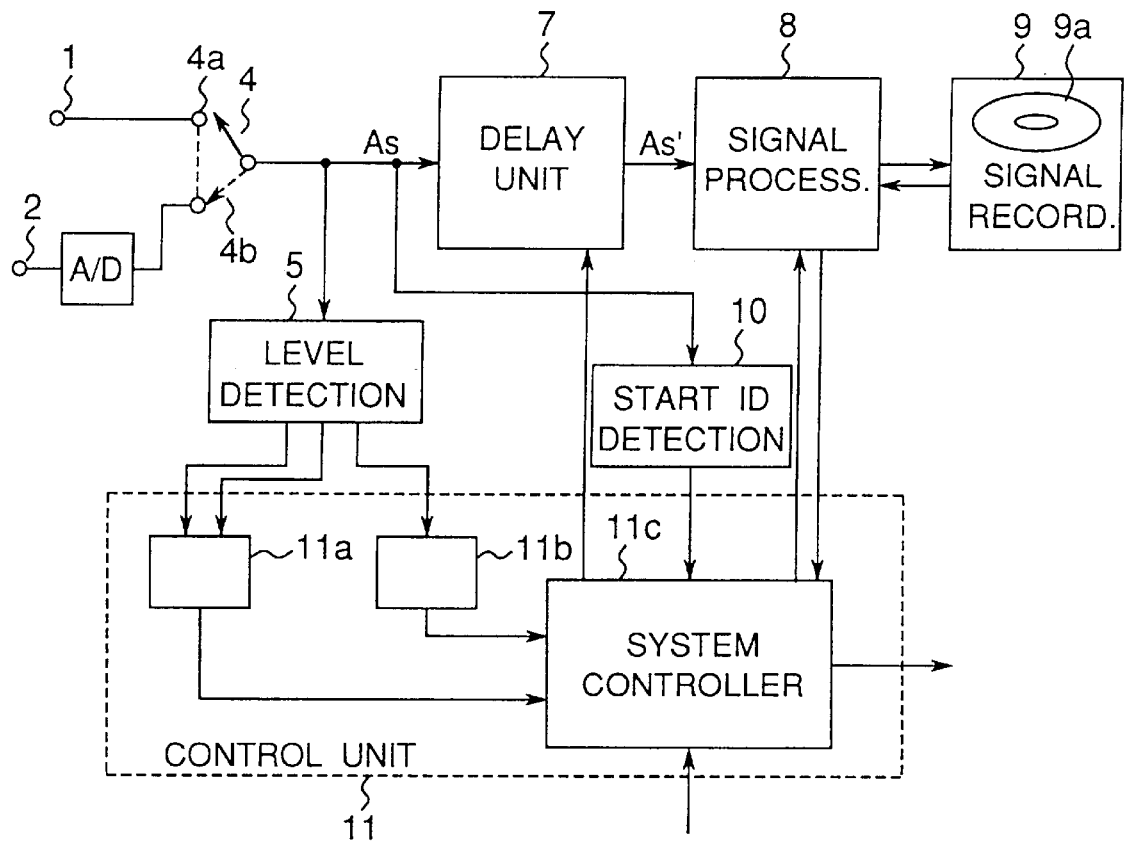
FIG. 9 is a block diagram showing a construction of a start ID recording system according to a second embodiment of the present invention.
Figure 10:
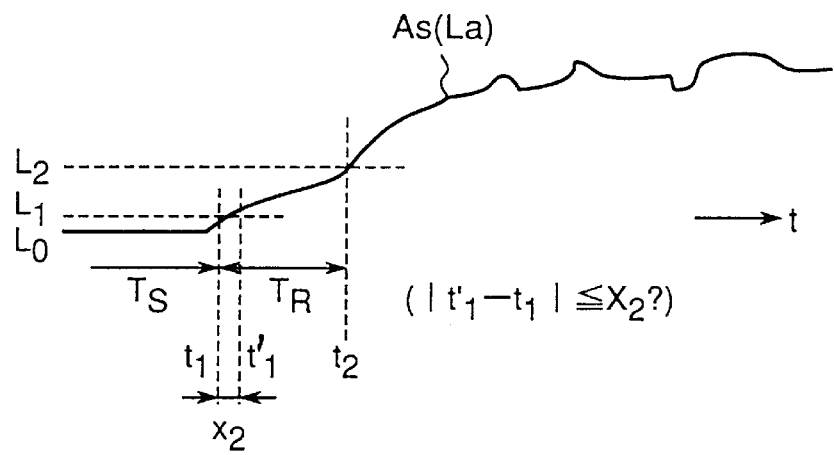
FIG. 10 is a timing chart for explaining an operation of the second embodiment of FIG. 9.
Figure 11:
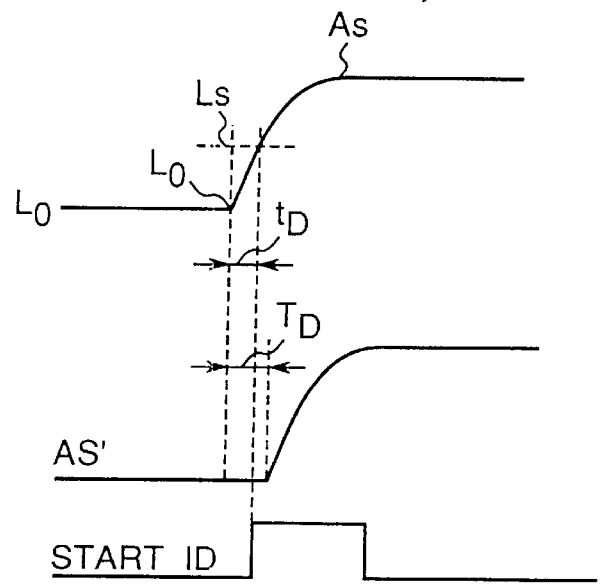
FIGS. 11, 12 and 13 are timing charts for explaining an operation of a conventional start ID recording system.
Figure 12:
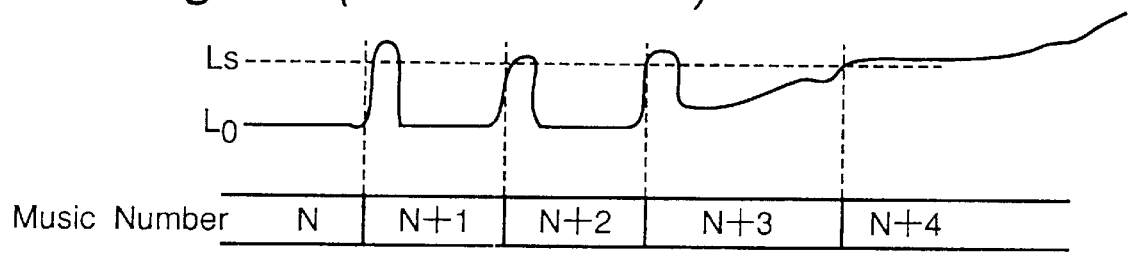
Figure 13:
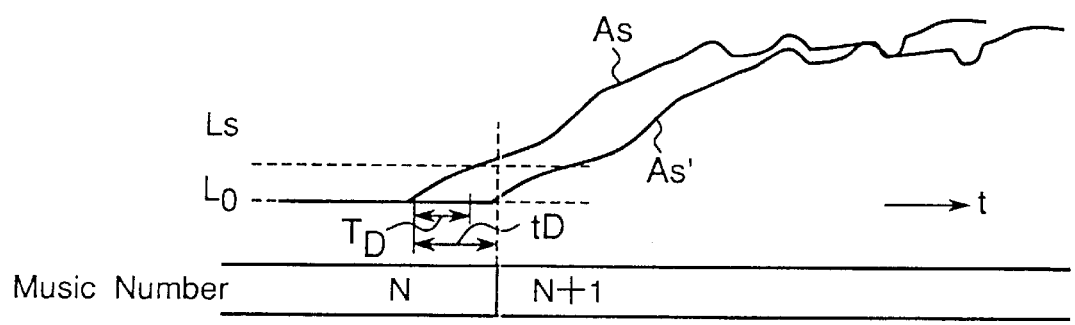

The following describes a second embodiment of the present invention with reference to FIGS. 9 and 10. Since the basic structure of the second embodiment is similar to that of the first embodiment, the explanation of the redundant parts is omitted here for brevity.

In the second embodiment, the description is made for explaining a case of copying information previously recorded in a recording medium such as a recording tape or a disc. When a digital audio signal is recorded in the medium by a user, in some cases a start ID signal or a renewed number of the audio signal is possibly recorded at an incorrect position displaced from the precise starting head thereof due to a displacement in recording position when manually recorded or due to a difference in the detection performance of an automatic recording system.

In this second embodiment, such an erroneous recording position of the recorded start ID is effectively compensated by further providing a start ID detection unit 10 and a modified control unit 11 in addition to the construction of the first embodiment, wherein the control unit 11 having a comparing function includes a delay counter 11a and a silent duration counter 11b as shown in FIG. 9. In this arrangement, it is to be noted that the level detection operation of the level detection unit 5 is the same as that of the first embodiment shown in FIG. 5.

The start ID detection unit 10 detects a start ID detection time t1' of the input audio signal As, which the resultant output thereof is applied to the control unit 11. In the control unit 11, the applied time value t1' is compared to the time t1 which is a detection result obtained by the level detection unit 5 at the turning point time t1 from the silent mode "0" to the inherent audio detection mode "1".

When the difference between the detection times t1 and t1' is within a given range (X2), it is judged that the start ID detection time t1' detected by the start ID detection unit 10 is correct. Then, the start ID recording command is transmitted from the control unit 11 to the signal processing unit 8 with a predetermined delay time of $T_D$ after the detection time t1'.

When the difference between the detection times t1 and t1' is beyond the given range (X2), the start ID signal is recorded in the same manner as in the first embodiment.

In more detail, in the control unit, the delay counter 11a and the silent duration counter 11b calculates a time period $(T_R)$ between a first time (t1) and a second time (t2) wherein at the first time (t1) the level detection unit detects that the digital audio signal level (La) becomes equal to and beyond the first given level (L1) and at the second time (t2) the level detection unit detects that the digital audio signal level (La) becomes equal to and beyond the second given level (L2). Then the control unit calculates a time difference $(T_N)$ between the predetermined delay time $(T_D)$ and the time period $(T_R)$ calculated by the counters 11a and 11b so that the start ID signal is recorded in the medium at a third time (t4) by calculating the time difference $T_N=T_D-T_R$, wherein the start ID recording time (t4) is decided by the time lapse $(T_N)$ from the second time point (t2).

Thus, in the second embodiment of the present invention, it is judged whether or not the start ID signal previously recorded in the original medium is correctly positioned, and when judged correct, then the start ID is recorded at a timing point based on the original recorded start ID. Whereas, when judged incorrect, the start ID is recorded in the manner described in the first embodiment.

In this embodiment, although the level detection unit, first and second counters, a system controller and the like components are individually constructed by way of a circuitry arrangement, it is to be noted here that these components can be realized by way of software of a microcomputer (CPU).

As described above, according to the first embodiment of the present invention, when the detection level La becomes equal to or higher than the second threshold level L2 at the time t2, it is judged that the rising portion of the actual audio signal is detected, and at the same time the counting of the delay counter is stopped so that the audio delay mode (2) is set up. Thus, the inherent delay time period $T_R$ at this point t2 can be obtained by calculating t2−t1. Accordingly, by calculating $T_N=T_D-T_R$, the start ID recording time t4 can be precisely decided by the time lapse $T_N$ from the time point t2. Accordingly, there can be realized a start ID recording system in which a start ID signal can be recorded at an appropriate position coincident with a starting head of a digital audio signal, thereby reliably avoiding influence of noise components without an omission of a head portion of an audio signal during reproduction thereof.

Moreover, according to the second embodiment, it is judged whether or not the start ID signal previously recorded in the original medium is correctly positioned, and when judged correct, then the start ID is recorded at a timing based on the originally recorded start ID. Whereas, when judged incorrect, the start ID is recorded in the manner described in the first embodiment.

What is claimed is:

1. A start ID recording system for recording a start ID signal on a recording medium in a digital audio information recording apparatus, said recording system comprising:

a level detection unit for checking a level of an input digital audio signal with reference to first and second given levels wherein the second given level is higher than the first given level;

a delay unit having a memory for temporarily storing the input digital audio signal and generating a delayed audio signal delayed by a predetermined delay time; and a control unit comprising first and second counters for calculating a time period between a first time and a second time wherein at the first time said level detection unit detects that the digital audio signal level is equal to and beyond the first given level and at the second time said level detection unit detects that the digital audio signal level is equal to and beyond the second given level, whereby said control unit calculates a time difference between the predetermined delay time and the time period calculated by said first and second counters so that the start ID signal is recorded on the recording medium at a third time by calculating the time difference, wherein the third time is decided by the calculated time difference from the second time.

2. The start ID recording system as claimed in claim 1, further comprising a signal processing unit for processing the delayed digital audio signal outputted from said delay unit to be added with the start ID signal to be recorded on the recording medium.

3. The start ID recording system as claimed in claim 1, wherein said delay unit comprises a semiconductor memory having a memory capacity of approximately 4 megabit to set up a sufficient delay time between the input and output audio signals thereof.

4. The start ID recording system as claimed in claim 1, wherein said delay unit comprises a RAM, a write-address generator section and a read-address generator section, and wherein said write-address generator sequentially generates write-addresses at a sampling frequency of the input digital audio signal and writes the input audio signal in said RAM simultaneously while said read-address generator sequentially generates read-addresses and simultaneously reads out the stored audio signal from said RAM after a predetermined time lapse.

5. The start ID recording system as claimed in claim 1, wherein said level detection unit comprises first and second level detection sections wherein said first level detection section has the first given level which is set up to be slightly higher than a silent level while said second level detection section has the second riven level which is set up to be sufficiently higher than the silent level to reliably detect the digital audio signal level distinct from noise components.

6. The start ID recording system as claimed in claim 1, wherein:

said level detection unit is operative to determine that said control unit is in a silent mode, and said second counter is operative to count a silent duration time period when the audio signal level is detected by said level detection circuit to be lower than the first given level;

said level detection unit is operative to stop said control unit from being in the silent mode, thereby stopping the counting operation of said second counter, and thereby obtaining the silent duration time period at the first time when the audio signal level is detected by said level detection circuit to be equal to the first given level at the first time; and said level detection unit is operative to set said control unit to be in an audio detection mode in which said first counter starts to count the time period when the audio signal level is detected by said level detection circuit to be higher than the first given level and lower than the second given level.

7. The start ID recording system as claimed in claim 6, wherein said level detection unit is operative to restore said control unit to be in the silent mode for a time period longer than a predetermined time period, start the counting operation of said second counter to count the silent duration time period, and reset said first counter when said level detection unit sets said control unit in the audio detection mode solely due to a noise component.

8. The start ID recording system as claimed in claim 6, wherein:

said level detection unit is operative to set said control unit to be in the audio detection mode and simultaneously start the counting of the silent duration time period by said second counter when the audio signal detected by said level detection circuit becomes lower than the first given level in an audio delay mode; and said level detection unit is operative to set said control unit to be in the silent mode, determine that the audio signal level is in an audio blank condition, and reset a count value of said first counter, thereby canceling noise component effects, when the silent duration time period is at least equal to a predetermined time period.

9. The start ID recording system as claimed in claim 1, wherein said level detection unit is operative to detect a rising portion of the audio signal to thereby stop the counting of said first counter when the audio signal level is detected by said level detection unit to be at least equal to the second given level at the second time so that the time period at the second time is obtained by calculating a difference between the first and second times, thereby calculating the time difference between the predetermined delay time and the time period to determine the start ID recording time by the time difference from the second time.

10. The start ID recording system as claimed in claim 9, wherein said control unit is operative to advance the start ID recording time to a fourth time from the third time determined from the calculated time difference taking into consideration a time delay existing between the silent level to the first given level, wherein the fourth time is slightly before the third time.

11. The start ID recording system as claimed in claim 1, further comprising a start ID detection unit for detecting a previously recorded start ID detection time of the inputted audio signal, wherein the previously recorded start ID detection time is outputted from said start ID detection unit and is applied to said control unit for comparison to the first time, and wherein the start ID signal is recorded at a time point after the predetermined delay time from the previously recorded start ID detection time when a difference between the previously recorded start ID detection time and the first time is within a given range.

* * * * *